(12) United States Patent
Yoshiyama et al.

(10) Patent No.: US 10,942,711 B2
(45) Date of Patent: Mar. 9, 2021

(54) INFORMATION PROCESSING METHOD AND INFORMATION PROCESSING APPARATUS

(71) Applicant: SONY CORPORATION, Tokyo (JP)

(72) Inventors: Kazuki Yoshiyama, Kanagawa (JP); Yoshiyuki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 324 days.

(21) Appl. No.: 15/774,318

(22) PCT Filed: Nov. 25, 2016

(86) PCT No.: PCT/JP2016/085025
§ 371 (c)(1),
(2) Date: May 8, 2018

(87) PCT Pub. No.: WO2017/138220
PCT Pub. Date: Aug. 17, 2017

(65) Prior Publication Data
US 2020/0257506 A1    Aug. 13, 2020

(30) Foreign Application Priority Data
Feb. 12, 2016    (JP) .............................. JP2016-024545

(51) Int. Cl.
*G06F 9/44*    (2018.01)
*G06F 17/50*    (2006.01)
(Continued)

(52) U.S. Cl.
CPC .............. *G06F 8/34* (2013.01); *G06F 3/0482* (2013.01); *G06F 3/04845* (2013.01);
(Continued)

(58) Field of Classification Search
CPC ...... G06F 8/34; G06F 3/0482; G06F 3/04845; G06F 3/00; G06F 17/18; G06F 9/451;
(Continued)

(56) References Cited

U.S. PATENT DOCUMENTS 5,253,330 A * 10/1993 Ramacher ................ G06N 3/04
706/42
5,875,108 A * 2/1999 Hoffberg ................... G06F 3/00
700/17
(Continued)

FOREIGN PATENT DOCUMENTS

JP    H03-33968 A    2/1991
JP    H04-153866 A    5/1992
(Continued)

OTHER PUBLICATIONS

S. Himavathi et al., Feedforward Neural Network Implementation in FPGA Using Layer Multiplexing for Effective Resource Utilization, 2007 IEEE, [Retrieved on Oct. 22, 2020]. Retrieved from the internet: <URL: https://ieeexplore.ieee.org/stamp/stamp.jsp?tp=&arnumber=4182384> 9 Pages (880-888) (Year: 2007).*
(Continued)

*Primary Examiner* — Anibal Rivera
(74) *Attorney, Agent, or Firm* — Paratus Law Group, PLLC

(57) ABSTRACT

There is provided an information processing apparatus and an information processing method to present information for improving development efficiency of a neural network to a user. The information processing method includes: providing, by a processor, a form for creating a program for establishing a neural network on a basis of a disposed component and property set for the component; and presenting statistical information relating to the neural network. The information processing apparatus includes a form control unit configured to provide a form for creating a program
(Continued)

for establishing a neural network on a basis of a disposed component and property set for the component. The form control unit presents statistical information relating to the neural network.

18 Claims, 13 Drawing Sheets

(51) Int. Cl.
| | |
|---|---|
| *G06N 3/08* | (2006.01) |
| *G06F 8/34* | (2018.01) |
| *G06F 3/0482* | (2013.01) |
| *G06F 3/0484* | (2013.01) |
| *G06F 17/18* | (2006.01) |
| *G06N 3/063* | (2006.01) |
| *G06F 9/451* | (2018.01) |
| *G06N 3/10* | (2006.01) |
| *G06F 9/50* | (2006.01) |
| *G06F 8/38* | (2018.01) |
| *G06F 8/35* | (2018.01) |

(52) U.S. Cl.
CPC ............. *G06F 17/18* (2013.01); *G06N 3/063* (2013.01); *G06N 3/084* (2013.01); *G06F 8/35* (2013.01); *G06F 8/38* (2013.01); *G06F 9/451* (2018.02); *G06F 9/453* (2018.02); *G06F 9/5011* (2013.01); *G06F 9/5083* (2013.01); *G06N 3/10* (2013.01)

(58) Field of Classification Search
CPC .... G06F 9/453; G06F 9/3017; G06F 9/30047; G06F 8/38; G06F 8/65; G06F 8/35; G06F 9/50; G06F 9/5011; G06F 9/5083; G06N 3/063; G06N 3/084; G06N 3/10; G06N 3/04; G06N 3/049; G06N 3/082; G06N 3/0454

See application file for complete search history.

(56) References Cited

U.S. PATENT DOCUMENTS

| | | | | |
|---|---|---|---|---|
| 6,038,555 | A * | 3/2000 | Field ................. | G06N 3/02 706/21 |
| 6,081,750 | A * | 6/2000 | Hoffberg ............. | G06F 3/00 700/17 |
| 6,400,996 | B1 * | 6/2002 | Hoffberg ............. | G05B 19/0426 370/218 |
| 6,418,424 | B1 * | 7/2002 | Hoffberg ............. | G06F 3/00 706/21 |
| 7,069,234 | B1 * | 6/2006 | Cornelius ............ | G06Q 20/10 705/26.35 |
| 7,124,101 | B1 * | 10/2006 | Mikurak .............. | G06Q 10/06 705/35 |
| 7,136,710 | B1 * | 11/2006 | Hoffberg ............. | H04N 21/252 700/83 |
| 7,167,844 | B1 * | 1/2007 | Leong ................. | G06Q 30/04 705/37 |
| 7,483,868 | B2 * | 1/2009 | Meng .................. | G06N 3/082 706/26 |
| 7,610,233 | B1 * | 10/2009 | Leong ................. | G06Q 10/087 705/26.3 |
| 7,716,077 | B1 * | 5/2010 | Mikurak .............. | G06Q 10/06 705/7.12 |
| 8,032,409 | B1 * | 10/2011 | Mikurak .............. | G06Q 30/00 705/14.39 |
| 9,063,818 | B1 * | 6/2015 | Risbood .............. | G06F 8/65 |
| 9,170,812 | B2 * | 10/2015 | Vorbach .............. | G06F 9/30047 |
| 9,235,801 | B2 * | 1/2016 | Portegys ............. | G06F 9/5083 |
| 9,600,767 | B1 * | 3/2017 | Nogin ................. | G06N 3/049 |
| 9,786,036 | B2 * | 10/2017 | Annapureddy ..... | G06K 9/66 |
| 10,282,822 | B2 * | 5/2019 | Shmunk .............. | G06T 5/20 |
| 10,361,802 | B1 * | 7/2019 | Hoffberg-Borghesani ........... G11B 27/11 |
| 2002/0184272 | A1 * | 12/2002 | Burges ................ | H04N 19/63 708/203 |
| 2003/0014377 | A1 * | 1/2003 | Barson ................ | H04M 15/00 706/20 |
| 2003/0158709 | A1 * | 8/2003 | Ishida ................. | G05B 13/0285 702/189 |
| 2005/0086635 | A1 * | 4/2005 | Parikh ................ | G06F 8/34 717/103 |
| 2005/0106311 | A1 * | 5/2005 | Okita ................. | A23L 33/105 426/655 |
| 2006/0178918 | A1 * | 8/2006 | Mikurak ............. | G06Q 10/06375 705/7.25 |
| 2006/0195409 | A1 * | 8/2006 | Sabe .................. | G05B 13/0265 706/16 |
| 2007/0016389 | A1 * | 1/2007 | Ozgen ................ | E21B 47/00 703/10 |
| 2007/0061735 | A1 * | 3/2007 | Hoffberg ............ | G06F 9/451 715/744 |
| 2007/0094168 | A1 | 4/2007 | Ayala et al. | |
| 2008/0306720 | A1 * | 12/2008 | Nicol ................. | H04S 7/30 703/13 |
| 2010/0032165 | A1 * | 2/2010 | Bailey ................ | G06F 30/00 166/369 |
| 2010/0306143 | A1 * | 12/2010 | de Mello Filho .... | G06F 8/00 706/15 |
| 2011/0016071 | A1 * | 1/2011 | Guillen .............. | G06N 3/10 706/27 |
| 2011/0029471 | A1 * | 2/2011 | Chakradhar ........ | G06N 3/063 706/25 |
| 2011/0116726 | A1 * | 5/2011 | Hosaka .............. | G06T 5/003 382/255 |
| 2011/0154109 | A1 * | 6/2011 | Levine ............... | G06F 11/0706 714/26 |
| 2011/0214878 | A1 * | 9/2011 | Bailey ............... | E21B 7/00 166/369 |
| 2012/0303564 | A1 * | 11/2012 | Dobson .............. | G16H 50/50 706/21 |
| 2013/0311412 | A1 * | 11/2013 | Lazar ................. | G06N 3/08 706/16 |
| 2014/0037739 | A1 * | 2/2014 | Schentag ............ | A61K 45/06 424/490 |
| 2014/0129491 | A1 * | 5/2014 | Sayyar-Rodsari ... | G05B 13/041 706/12 |
| 2014/0137117 | A1 * | 5/2014 | Ding .................. | G06F 11/3447 718/1 |
| 2014/0201126 | A1 * | 7/2014 | Zadeh ................. | A61B 5/165 706/52 |
| 2014/0372226 | A1 * | 12/2014 | Pavley ............... | G06Q 30/0269 705/14.66 |
| 2015/0026108 | A1 * | 1/2015 | Portegys ............ | G06F 9/5083 706/21 |
| 2015/0199963 | A1 * | 7/2015 | Maaninen ........... | G10L 15/16 704/232 |
| 2015/0205602 | A1 * | 7/2015 | Prismon ............. | G06F 8/34 717/121 |
| 2015/0254555 | A1 * | 9/2015 | Williams, Jr. ...... | G06N 3/0454 706/14 |
| 2015/0262061 | A1 * | 9/2015 | Konertz ............. | G06N 3/049 706/11 |
| 2015/0339572 | A1 * | 11/2015 | Achin ................ | G06F 9/5011 706/46 |
| 2016/0092765 | A1 * | 3/2016 | Chilimbi ............ | G06N 3/084 706/25 |
| 2016/0162779 | A1 * | 6/2016 | Marcus .............. | G06N 20/00 706/12 |
| 2016/0210550 | A1 * | 7/2016 | Merrill ............... | G06N 3/0454 |
| 2016/0239065 | A1 * | 8/2016 | Lee .................... | G06F 1/324 |
| 2016/0321784 | A1 * | 11/2016 | Annapureddy ..... | G06N 3/082 |
| 2016/0358070 | A1 * | 12/2016 | Brothers ............. | G06N 3/0454 |
| 2016/0379115 | A1 * | 12/2016 | Burger ............... | G06F 15/7803 706/25 |
| 2017/0124450 | A1 * | 5/2017 | Hara .................. | G06N 3/0454 |
| 2017/0154212 | A1 * | 6/2017 | Feris .................. | G06T 7/13 |

(56) References Cited

U.S. PATENT DOCUMENTS

| | | | | |
|---|---|---|---|---|
| 2017/0220943 | A1* | 8/2017 | Duncan | G06F 8/38 |
| 2018/0068219 | A1* | 3/2018 | Turner | G06N 7/005 |
| 2018/0315141 | A1* | 11/2018 | Hunn | G06F 40/42 |
| 2019/0347125 | A1* | 11/2019 | Sankaran | G06F 9/3863 |
| 2020/0027014 | A1* | 1/2020 | Wen | G06F 9/5077 |
| 2020/0090278 | A1* | 3/2020 | Christensen | G06N 20/00 |

FOREIGN PATENT DOCUMENTS

| | | |
|---|---|---|
| JP | H04-190461 A | 7/1992 |
| JP | H09-160949 A | 6/1997 |
| JP | H10-049566 A | 2/1998 |
| JP | 2001-282574 A | 10/2001 |

OTHER PUBLICATIONS

Janardan Misra et al., Artifitial neural networks in hardware: A survey of two decades of progress, 2010, [Retrieved on Oct. 22, 2020]. Retrieved from the internet: <URL: https://pdf.sciencedirectassets.com/271597/1-s2.0-S0925231210X00078/1-s2.0-S092523121000216X/main.pdf?> 17 Pages (239-255) (Year: 2010).*

IBM SPSS Neural Networks 21, 2012, pp. 4-24 and 41-60, IBM Corporation, retrieved from: ftp://public.dhe.ibm.com/software/analytics/spss/documentation/statistics/21.0/ja/client/Manuals/IBM_SPSS_Neural_Network.pdf.

Mar. 19, 2019, Japanese Decision to Grant a Patent issued for related JP Application No. 2017-566526.

Jan. 17, 2019, European Search Report issued for related EP Application No. 16889921.9.

* cited by examiner

FIG. 6

| Affine | |
|---|---|
| Name | Affine #2 |
| Input | 64 |
| OutShape | 10 |
| Output | 10 |
| CostAdd | 10 |
| CostMultiplyAdd | 640 |
| CostParameter | 650 |

FIG. 7

| Network Statistics | |
|---|---|
| Output | 932 |
| CostParameter | 50890 |
| CostAdd | 212 |
| CostMultiply | 0 |
| CostMultiplyAdd | 50816 |
| CostDivision | 74 |
| CostExp | 74 |
| CostIf | 0 |

| Network Statistics | |
|---|---|
| Output | 2500 |
| CostParameter | 59514 |
| CostAdd | 1790 |
| CostMultiply | 0 |
| CostMultiplyAdd | 58656 |
| CostDivision | 858 |
| CostExp | 858 |
| CostIf | 0 |

FIG. 12

| Estimated Result | |
|---|---|
| Training Time (s) | X,XXX |
| Memory Usage (MB) | X,XXX |
| Power Consumption (W) | X,XXX |
| Calculation (Num) | X,XXX |

FIG. 13

| Estimated Conditions | |
|---|---|
| Instance type | X |
| Num.Instances | X,XXX |
| Cost ($) | X,XXX |
| Training Time (s) | X,XXX |

| Input |
| Convolution #1 | 416 |
| MaxPooling #1 |
| Tanh #1 |
| Convolution #2 | 6416 |
| MaxPooling #2 |
| Tanh #2 |
| Affine #1 | 12850 |
| Tanh #3 |
| Affine #2 | 510 |
| Softmax |
| Output |

P3

| Network Statistics | |
|---|---|
| Output | 16264 |
| CostParameter | 20192 |
| CostAdd | 15530 |
| CostMultiply | 0 |
| CostMultiplyAdd | 653300 |
| CostDivision | 2620 |
| CostExp | 2620 |
| CostIf | 10240 |

| Execution Result | |
|---|---|
| Training Time (s) | X,XXX |
| Memory Usage (MB) | X,XXX |
| Power Consumption (W) | X,XXX |
| Calculation (Num) | X,XXX |

INFORMATION PROCESSING METHOD AND INFORMATION PROCESSING APPARATUS

CROSS REFERENCE TO PRIOR APPLICATION

This application is a National Stage Patent Application of PCT International Patent Application No. PCT/JP2016/085025 (filed on Nov. 25, 2016) under 35 U.S.C. § 371, which claims priority to Japanese Patent Application No. 2016-024545 (filed on Feb. 12, 2016), which are all hereby incorporated by reference in their entirety.

TECHNICAL FIELD

The present disclosure relates to an information processing method and an information processing apparatus.

BACKGROUND ART

In recent years, a neural network which imitates a mechanism of a cranial neural system has attracted attention. Meanwhile, various kinds of methods for improving working efficiency relating to programming have been proposed in software development. For example, Patent Literature 1 discloses a software generation method utilizing visual programming language.

CITATION LIST

Patent Literature

Patent Literature 1: JP 2002-268883A

DISCLOSURE OF INVENTION

Technical Problem

However, with the method disclosed in Patent Literature 1, it is difficult to deal with parameters and calculation specific to a neural network.

Therefore, the present disclosure proposes an information processing method and an information processing apparatus which can present information for improving development efficiency of the neural network to a user.

Solution to Problem

According to the present disclosure, there is provided an information processing method including: providing, by a processor, a form for creating a program for establishing a neural network on a basis of a disposed component and property set for the component; and presenting statistical information relating to the neural network.

In addition, according to the present disclosure, there is provided an information processing apparatus including a form control unit configured to provide a form for creating a program for establishing a neural network on a basis of a disposed component and property set for the component. The form control unit presents statistical information relating to the neural network.

In addition, according to the present disclosure, there is provided an information processing apparatus including a program creating unit configured to create a program for establishing a neural network on a basis of a component disposed on a form and property set for the component. The program creating unit calculates statistical information relating to the neural network.

Advantageous Effects of Invention

As described above, according to the present disclosure, it is possible to present information for improving development efficiency of a neural network to a user. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a display example of property according to the embodiment.

FIG. 7 is a display example of statistical information according to the embodiment.

FIG. 12 is a display example of execution prediction information according to the embodiment.

FIG. 13 is a display example of estimation information according to the embodiment.

FIG. 15 is a diagram for explaining comparison information of layers according to the embodiment.

FIG. 16 is a display example of an execution result according to the embodiment.

MODE(S) FOR CARRYING OUT THE INVENTION

Figure 1:
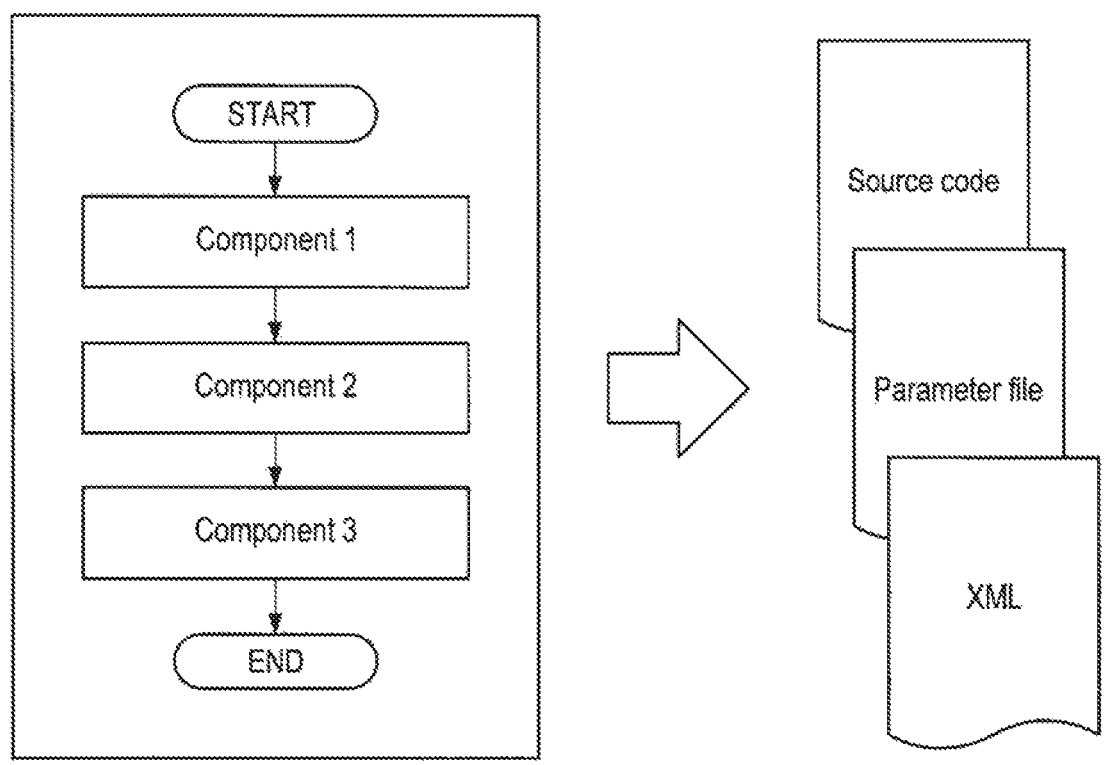
FIG. 1 is a diagram for explaining visual programming according to related technology of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Background
1.1. Neural network
1.2. Outline of visual programming
2. Embodiment
2.1. System configuration example according to present disclosure
2.2. Information processing terminal according to present embodiment
2.3. Server 30 according to present embodiment
2.4. Explanation of form according to present embodiment
2.5. Real time property relating to calculation of statistical information
2.6. Calculation of execution prediction information on hardware
2.7. Calculation of estimation information of cloud resource
2.8. Coordination among statistical information, property and estimation information
2.9. Presentation of comparison information relating to layers
2.10. Presentation of execution result relating to neural network
3. Hardware configuration example
4. Conclusion 1. Background 1.1. Neural Network A neural network refers to a model imitating a human cranial neural circuit and is technology for implementing a human learning ability on a computer. As described above, one feature of a neural network is that it has a learning ability. In a neural network, artificial neurons (nodes) forming a network by synaptic coupling are able to acquire a problem solving ability by changing a synaptic coupling strength through learning. In other words, a neural network is able to automatically infer a problem resolution rule by repeating learning.

Examples of teaming by a neural network can include image recognition and speech recognition. In a neural network, it is possible to classify input image information into one of numbers from 0 to 9 by, for example, repeatedly learning handwritten number patterns. The learning ability of the neural network as described above has attracted attention as a key for advancing development of artificial intelligence. Further, pattern recognition of the neural network is expected to be applied in various kinds of industrial fields.

The information processing method and the information processing apparatus according to the present disclosure have been made while attention has been focused on approach for developing a neural network as described above, and can improve development efficiency in visual programming of a neural network.

1.2. Outline of Visual Programming

Subsequently, outline of visual programming according to the present disclosure will be described. In the present disclosure, visual programming refers to approach for creating a program using visual objects without describing a program code in text in software development. In visual programming, for example, it is possible to create a program by operating objects on a graphical user interface (GUI).

FIG. 1 is an image diagram of visual programming according to the present disclosure. FIG. 1 illustrates a product produced on the basis of objects (components) disposed on the GUI. In an example illustrated in FIG. 1, components 1 to 3 are disposed so as to be sequentially processed. Here, the components 1 to 3 may be components respectively meaning, for example, importing of data, processing of data and output of data. Further, as illustrated in FIG. 1, in the visual programming according to the present disclosure, besides a source code, a configuration file, an XML file, or the like, may be generated.

The background according to the present disclosure has been described above. As described above, the information processing method and the information processing apparatus according to the present disclosure can improve development efficiency in visual programming of a neural network. In the following description of an embodiment, effects provided by characteristics will be described using the characteristics of the information processing method and the information processing apparatus according to the present disclosure.

2. Embodiment 2.1. System Configuration Example According to Present Disclosure

Figure 2:
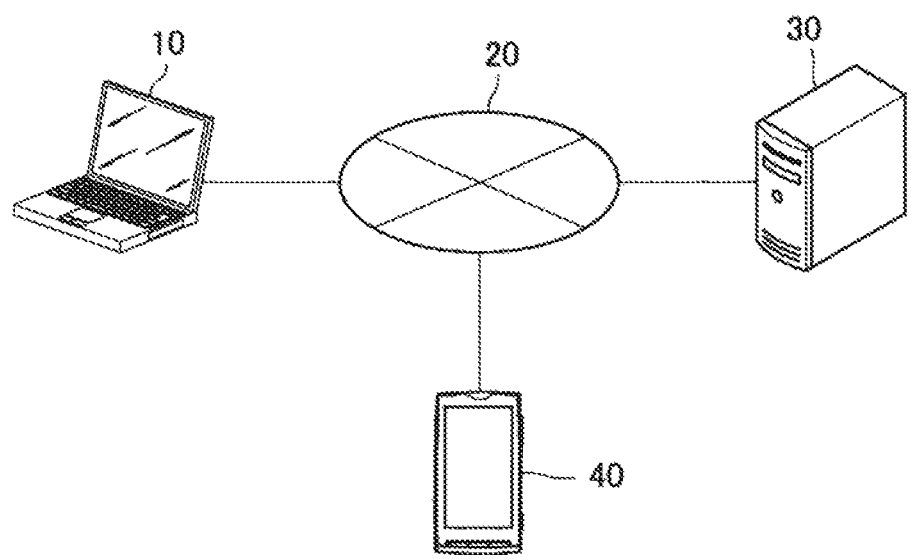
FIG. 2 is a diagram illustrating a system configuration example according to an embodiment of the present disclosure.

First, a system configuration example for implementing the information processing method according to an embodiment of the present disclosure will be described with reference to FIG. 2. Referring to FIG. 2, a system for implementing the information processing method according to the present embodiment includes an information processing terminal 10, a server 30 and a device 40. Further, the information processing terminal 10, the server 30 and the device 40 are connected so as to be able to communicate with each other via a network 20.

Here, the information processing terminal 10 according to the present embodiment is an information processing apparatus for performing visual programming of a neural network. Further, the server 30 is an information processing apparatus which provides a form for performing visual programming to the information processing terminal 10 and which creates a program relating to a neural network on the basis of components disposed on the form. Still further, the device 40 is hardware which executes the program of the neural network created by the server 30. The device 40 may be, for example, a smartphone, a tablet, a personal computer (PC), or the like.

Further, the network 20 may be a public network such as the Internet, a telephone network and a satellite communication network or may include a private network such as an internet protocol-virtual private network (IP-VPN).

In the information processing method according to the present embodiment, a form for creating a program for establishing a neural network on the basis of disposed components and property set for the components is provided. Further, one feature of the information processing method according to the present embodiment is that statistical information relating to the above-described neural network (hereinafter, also simply referred to as statistical information) is presented. Still further, the statistical information may be calculated in real time on the basis that the components or the property set for the components are changed. By this means, a user can perform visual programming while confirming the statistical information relating to the neural network in real time.

2.2. Information Processing Terminal According to Present Embodiment

The information processing terminal 10 according to the present embodiment will be described in detail next. The information processing terminal 10 according to the present embodiment has a function of providing a form relating to visual programming of a neural network to the user. Further, the information processing terminal 10 has a function of presenting statistical information relating to the neural network to be created to the user. The statistical information relating to the neural network may include the number of output units, the number of parameters to be processed, a calculation amount for each type of calculation in the neural network, or the like. Further, as described above, the statistical information may be information calculated in real time on the basis that the components or the property are changed.

Figure 3:
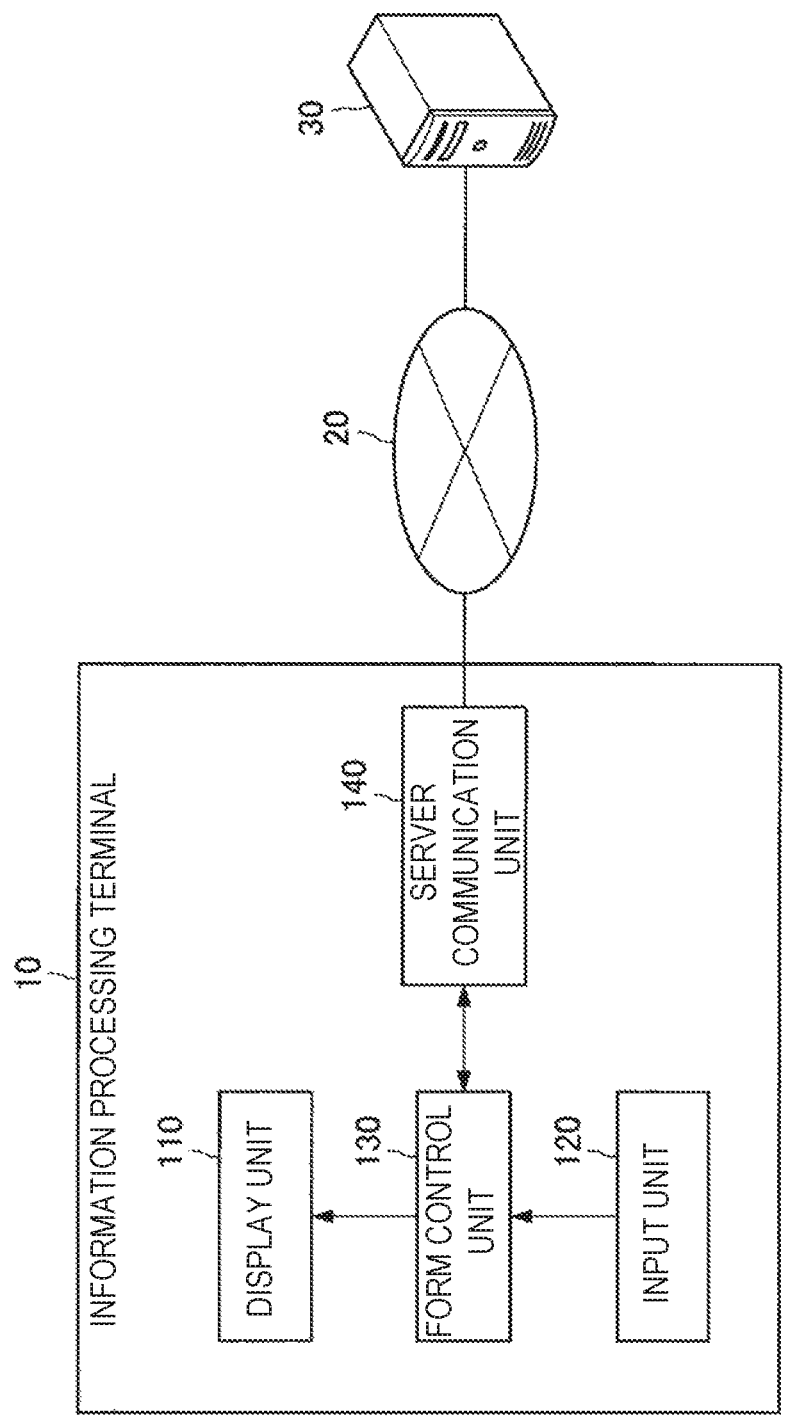
FIG. 3 is a functional block diagram of an information processing terminal according to the embodiment.

Referring to FIG. 3, the information processing terminal 10 according to the present embodiment includes a display unit 110, an input unit 120, a form control unit 130 and a server communication unit 140. Each component provided at the information processing terminal 10 will be described below.

(Display Unit 110)

The display unit 110 has a function of displaying information to be controlled by each component of the information processing terminal 10. In the present embodiment, particularly, the display unit 110 may have a function of displaying a form for performing visual programming of a neural network. The above-described function may be implemented by, for example, a cathode ray tube (CRT) display apparatus, a liquid crystal display (LCD) apparatus, and an organic light emitting diode (OLED) apparatus. Further, the display unit 110 may have a function as an input unit which accepts information input from the user. The function as the input unit can be implemented by, for example, a touch panel.

(Input Unit 120)

The input unit 120 has a function of accepting information input from the user and handing over the input information to each component of the information processing terminal 10. In the present embodiment, particularly, the input unit 120 may have a function of accepting user operation on the form relating to the visual programming and handing over the input information based on the operation to the form control unit 130 which will be described later. The above-described function may be implemented by, for example, a keyboard or a mouse.

(Form Control Unit 130)

The form control unit 130 has a function of controlling a form relating to visual programming of a neural network. Specifically, the form control unit 130 can control components on the form or values of the components on the basis of information acquired from the input unit 120. Further, the form control unit 130 has a function of controlling content to be displayed by the display unit 110 on the basis of information acquired from the server 30 via the server communication unit 140 which will be described later.

(Server Communication Unit 140)

The server communication unit 140 has a function of performing information communication with the server 30 via the network 20. Specifically, the server communication unit 140 transmits information relating to the above-described form to the server 30 on the basis of control by the form control unit 130. Further, the server communication unit 140 hands over the information acquired from the server 30 to the form control unit 130.

2.3 Server 30 According to Present Embodiment

The server 30 according to the present embodiment will be described in detail next. The server 30 according to the present embodiment is an information processing apparatus which creates a program for establishing a neural network on the basis of components disposed on the form and property set for the components. Further, the server 30 has a function of calculating statistical information relating to the above-described neural network. Still further, the server 30 can cause an emulator or a device 40 to execute the created neural network.

Figure 4:
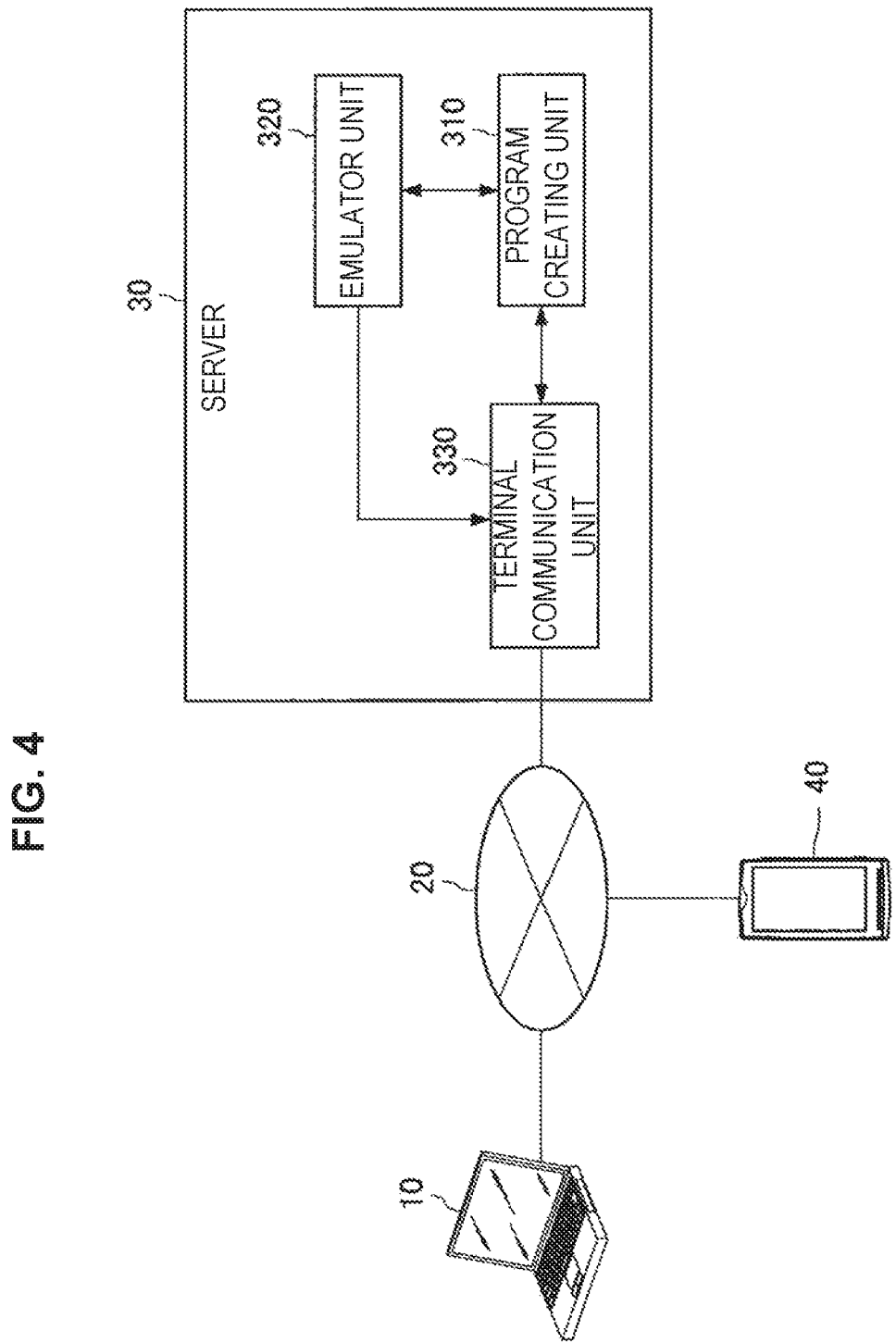
FIG. 4 is a functional block diagram of a server according to the embodiment.

Referring to FIG. 4, the server 30 according to the present embodiment includes a program creating unit 310, an emulator unit 320 and a terminal communication unit 330. Each component provided at the server 30 will be described below.

(Program Creating Unit 310)

The program creating unit 310 has a function of creating a program for establishing a neural network on the basis of information acquired from the information processing terminal 10 via the terminal communication unit 330 which will be described later. Further, the program creating unit 310 has a function of calculating statistical information relating to a neural network in real time on the basis of the information acquired from the information processing terminal 10. Here, the information acquired from the information processing terminal 10 may be information relating to components disposed on the form and property set for the components. Further, as described above, the statistical information may be the number of output units, the number of parameters to be processed, a calculation amount for each type of calculation in a neural network, or the like.

Further, the program creating unit 310 according to the present embodiment can calculate execution prediction information in the case where processing by a neural network is executed on hardware. The program creating unit 310 can calculate the execution prediction information on the basis of the statistical information and profile information of the hardware set in advance. The execution prediction information may include execution time of processing by a neural network, a memory usage amount, consumed power, a calculation amount, or the like. Further, the execution prediction information may be information which is calculated in real time on the basis of change of the statistical information. Note that the above-described hardware may be hardware different from the device 40 connected via the network 20.

Further, the program creating unit 310 according to the present embodiment can calculate estimation information relating to computing resources on cloud for executing processing by the created neural network. The program creating unit 310 can calculate the estimation information on the basis of the statistical information and information acquired from cloud service which provides computing resources. The estimation information may include types of instances, the number of the instances, cost of the computing resources, processing time by the neural network, or the like. Further, the estimation information may be information calculated in real time on the basis of change of the statistical information.

(Emulator Unit 320)

The emulator unit 320 has a function of executing the program for establishing the neural network created by the program creating unit 310 on the emulator and acquiring an execution result. The emulator unit 320 may include a plurality of emulators relating to hardware on which the above-described neural network is implemented. Further, the emulator unit 320 may cause the emulator connected to the server 30 via the network 20 to execute the program and acquire an execution result.

Further, the emulator unit 320 has a function of causing the device 40 to execute the program created by the program creating unit 310 and acquiring an execution result. The execution result of the neural network on the emulator or the device 40 may include execution time of the processing, a memory usage amount, consumed power, a calculation amount, or the like.

(Terminal Communication Unit 330)

The terminal communication unit 330 has a function of performing information communication with the information processing terminal 10 and the device 40 via the network 20. Specifically, the terminal communication unit 330 transmits information calculated by the program creating unit 310 to the information processing terminal 10. Here, the information calculated by the program creating unit 310 may include the statistical information, the execution prediction information on hardware and estimation information of the cloud resources. Further, the terminal communication unit 330 transmits information acquired by the emulator unit 320 to the information processing terminal 10. Here, the information acquired by the emulator unit 320 may include the execution result of the neural network on the emulator or the hardware.

2.4. Explanation of Form According to Present Embodiment

The form for performing visual programming according to the present embodiment will be described in detail next. The form according to the present embodiment may be displayed at the display unit 110 of the information processing terminal 10. The user can establish a neural network by performing operation on the above-described form.

Figure 5:
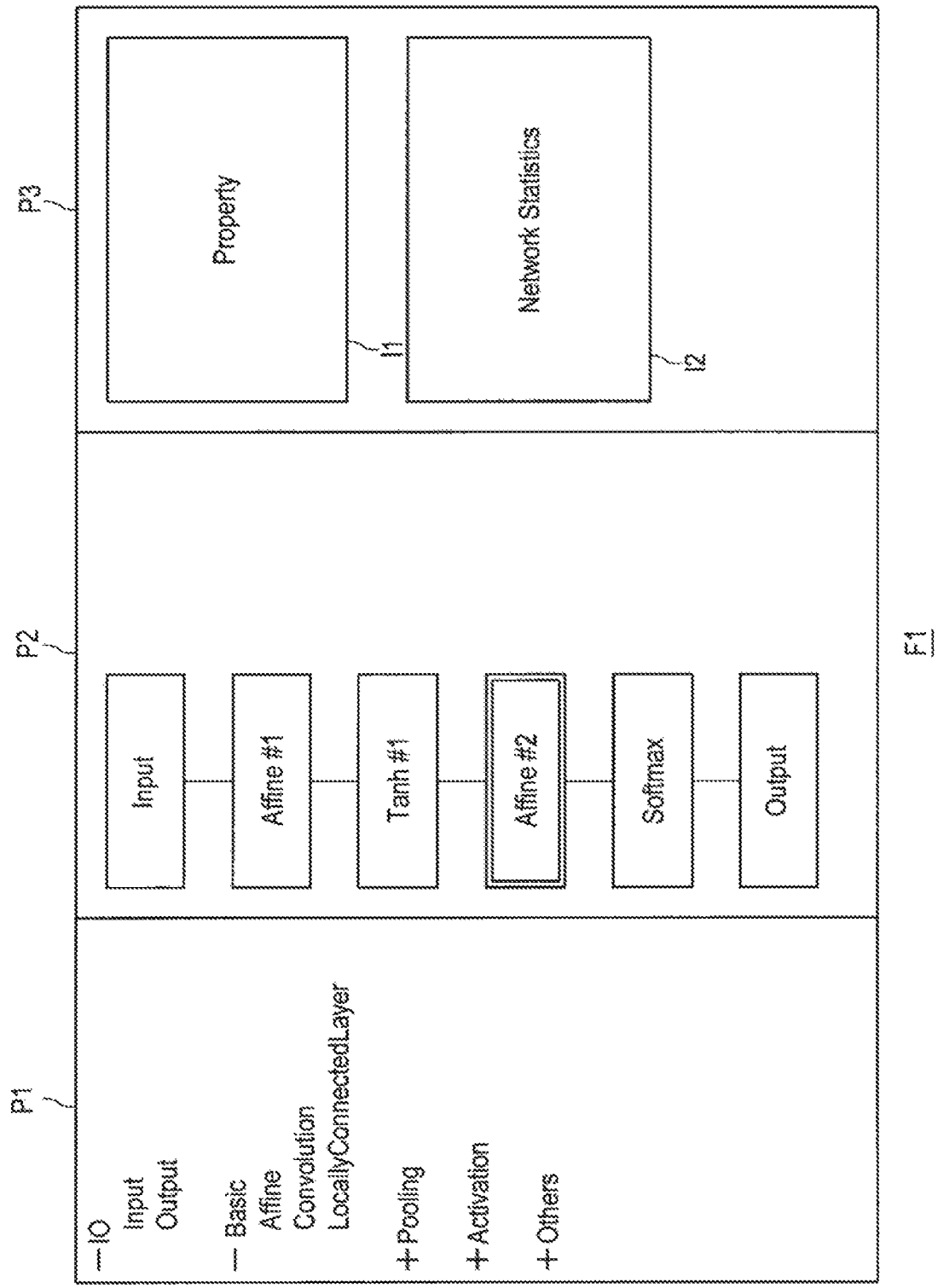
FIG. 5 is a diagram for explaining a form according to the embodiment.

FIG. 5 is a diagram illustrating a configuration example of the form according to the present embodiment. Referring to FIG. 5, a form F1 according to the present embodiment includes palettes P1 to P3. Here, the palette P1 may be a region for displaying a list of components. Further, the palette P2 may be a region for editing the components to establish a neural network. Still further, the palette P3 may be a region for displaying various kinds of information relating to the above-described neural network.

Note that the components according to the present embodiment respectively correspond to layers constituting the neural network. Therefore, in the following description, the components and the layers will be identically handled, and the both will be referred to as layers in common.

(Palette P1)

As described above, the palette P1 is a region for displaying a list of layers. As in an example illustrated in FIG. 5, the layers may be displayed for each classification in the palette P1. Further, control may be performed so that a list of layers for each classification is expanded by a classification name being clicked. Referring to FIG. 5, in the palette P1, a list of layers classified into an input/output layer, a middle layer, an activating function, or the like, is displayed. By dragging a layer displayed in the palette P1, the user can add the corresponding layer to the palette P2. Alternatively, by selecting a layer displayed in the palette P1, the corresponding layer may be added to the palette P2. Note that, because the layers illustrated in FIG. 5 and the subsequent drawings are well known, detailed description will be omitted.

(Palette P2)

The palette P2 is a region for editing the layers to establish a neural network. In an example illustrating in FIG. 5, processing flow in a neural network is constructed by connecting the layers with lines. The user can visually establish a neural network by moving, adding or deleting layers. Further, in the palette P2, a layer selected by the user may be displayed in a display format different from display formats of other layers. An example in FIG. 5 illustrates a state where a layer "Affine #2" is selected.

(Palette P3)

The palette P3 is a region for displaying various kinds of information relating to a neural network. Referring to FIG. 5, in the palette P3, property information relating to the layer selected in the palette P2 is displayed as information i1. Further, in the palette P3, statistical information of the neural network based on layers disposed in the palette P2 is displayed as information i2. Note that, in the palette P3, in addition to the property information and the statistical information, the execution prediction information on hardware, the estimation information of cloud resources, an execution result on the emulator or the device 40, or the like, may be displayed.

(Property Information)

Subsequently, the property information displayed in the palette P3 will be described in detail. FIG. 6 is an example of the property information displayed in the palette P3. FIG. 6 illustrates an example of the property information in the case where the layer "Affine #2" is selected in the palette P2 in FIG. 5. Referring to FIG. 6, the property information includes information automatically calculated by a connection state of the layers and characteristics of the layer, and a setting value specific for each type of the layer, in addition to basic information relating to the layer, such as "Name" indicating name of the layer.

"Input" and "Output" are values indicating input/output sizes of the layer. Further, "CostAdd" and "CostMultiplyAdd" may be information relating to a calculation amount at the layer. Further, "CostParameter" is a value indicating the number of parameters (memory amount) included in the layer. Each item described above may be an item automatically calculated on the basis of a connection state of the layers or a setting value which will be described later. The user can understand the memory amount and the calculation amount in each layer without performing manual calculation by confirming the above-described each item. Note that "CostAdd" and "CostMultiplyAdd" will be described in detail later.

"OutShape" is an item for designating an output neuron number of the Affine layer. In this manner, the property information may include a setting value specific for each type of the layer. Further, while not illustrated in an example in FIG. 6, the setting value specific for each type of the layer may include items other than "OutShape". For example, in a case of the Affine layer, the property information may include an item designating whether or not there is a bias term and various kinds of items relating to a weight. It is possible to set details of processing in each layer by designating an arbitrary value as the setting value as described above.

(Statistical Information)

Subsequently, the statistical information displayed in the palette P3 will be described in detail. As described above, the statistical information according to the present embodiment is information calculated in real time on the basis that the layers disposed on the form and property of the layers are changed. Further, the statistical information according to the present embodiment may be a sum of the memory amount and the calculation amount calculated for each layer.

FIG. 7 is a diagram illustrating statistical information in the case where layers are disposed on the palette P2 as in FIG. 5. Referring to FIG. 7, the statistical information includes "Output" and "CostParameter". Here, "Output" may be a value indicating a sum of output units relating to the whole neural network. That is, "Output" means the number of midway calculation values (buffers) held during calculation process. Further, "CostParameter" may be a sum of parameters relating to the whole neural network.

Further, the statistical information further includes "CostAdd", "CostMultiply", "CostMultiplyAdd", "CostDivision", "CostExp" and "CostIf". The above-described each item indicates a sum of the calculation amount for each type of calculation processed by the neural network. The above-described respective items may be values respectively indicating the number of times of addition, the number of times of multiplication, the number of times of multiply add, the number of times of division, the number of times of index calculation and the number of times of judgment of conditional branching. Note that, in an example illustrated in FIG. 7, the value of "CostMultiply" is 0, because the number of times of multiplication is included in the number of times of multiply add.

2.5. Real Time Property Relating to Calculation of Statistical Information

Real time property relating to calculation of the statistical information according to the present embodiment will be described next. As described above, according to the information processing method according to the present embodiment, it is possible to calculate the statistical information in real time on the basis that the layers and the property set for the layers are changed. The real time property relating to the calculation of the statistical information according to the present embodiment will be described below with reference to FIG. 8 and FIG. 9.

(Calculation of Statistical Information Based on Change of Layer Configuration)

Figure 8:
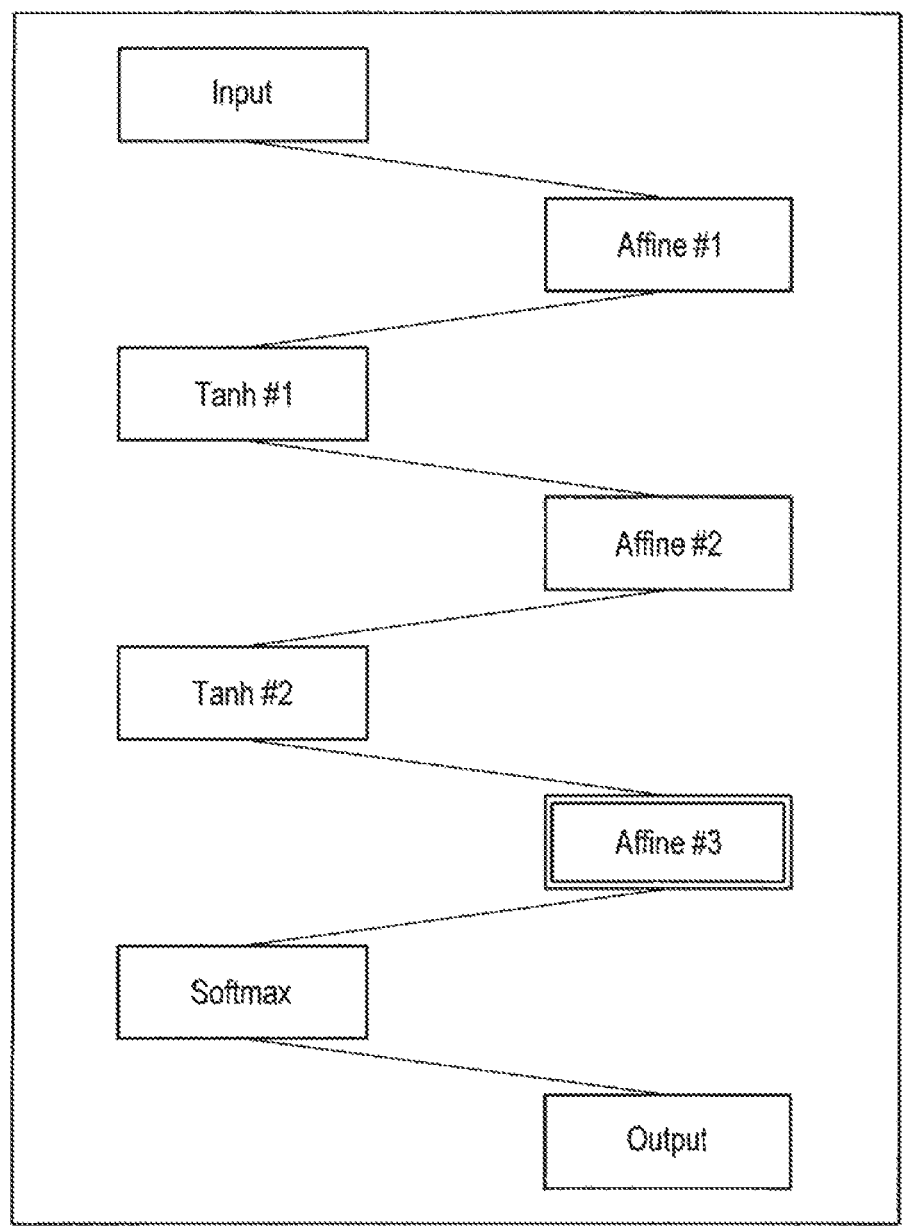
FIG. 8 is a diagram for explaining change of a layer configuration according to the embodiment.

FIG. 8 is a diagram illustrating that a layer configuration relating to the neural network is changed on the palette P2. In an example illustrated in FIG. 8, layers "Tanh #2" and "Affine #3" are newly added in addition to the layer configuration illustrated in FIG. 5. Note that, as illustrated in FIG. 8, each layer on the palette P2 does not have to be linearly disposed.

Figures 9, 10:
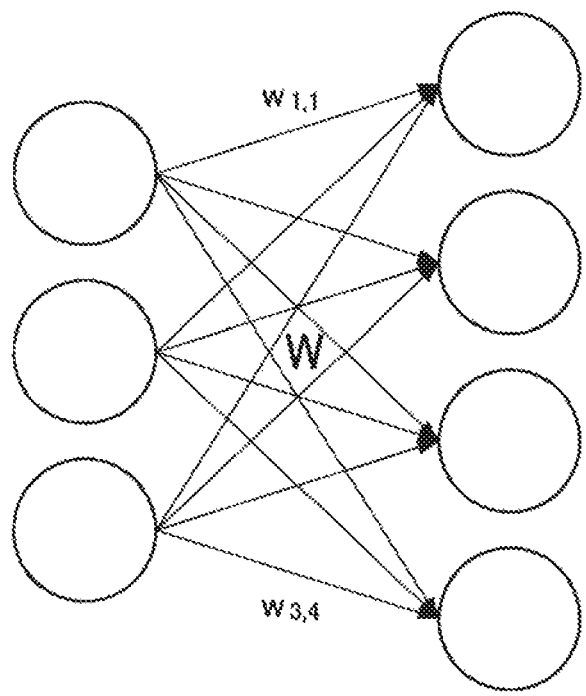
FIG. 9 is a diagram for explaining real-time updating of the statistical information according to the embodiment.
FIG. 10 is a diagram for explaining a calculation method specific to an Affine layer according to the embodiment.

Subsequently, FIG. 9 will be referred to. FIG. 9 is a diagram illustrating the statistical information in a case of the layer configuration illustrated in FIG. 8. That is, FIG. 9 illustrates statistical information updated on the basis of change of the layer configuration. Referring to FIG. 9, it can be understood that each item indicated by the statistical information is updated from a state illustrated in FIG. 7. Specifically, in the statistical information illustrated in FIG. 9, values of "Output" and "CostParameter" increase compared to the statistical information illustrated in FIG. 7. Further, in the statistical information illustrated in FIG. 9, values of "CostAdd", "CostMultiplyAdd", "CostDivision" and "CostExp" respectively increase compared to the statistical information illustrated in FIG. 7.

As described above, in the information processing method according to the present embodiment, it is possible to calculate the statistical information in real time on the basis that the layers and property set for the layers are changed. That is, the program creating unit 310 of the server 30 can calculate the statistical information in real time on the basis that the layer configuration is changed on the form displayed at the information processing terminal 10. In the example described using FIG. 8 and FIG. 9, the program creating unit 310 updates the values of the statistical information on the basis that the layers "Tanh #2" and "Affine #3" are added on the form.

Note that, while an example in the case where layers are added has been described above, the program creating unit 310 updates the statistical information also in the case where layers are deleted or in the case where the property of the layers is changed. For example, the program creating unit 310 can update the statistical information on the basis that a value of "OutShape" is changed at the property of the Affine layer. As a result of the program creating unit 310 updating the statistical information in real time on the basis of change of the layer configuration, the user can perform visual programming of a neural network while confirming the latest statistical information.

Updating of the statistical information according to the present embodiment has been described above. As described above, the statistical information according to the present embodiment is a sum of the number of parameters and the calculation amount calculated for each layer. That is, the program creating unit 310 according to the present embodiment can update the values of the statistical information by recalculating the number of parameters and the calculation amount relating to each layer when the layer configuration is changed. A method for calculating the number of parameters and the calculation amount in the layers will be described using examples.

(Calculation Example Relating to Affine Layer)

A method for calculating the number of parameters in the Affine layer will be described first. The number of parameters in the Affine layer may be calculated on the basis of the number of Inputs and Outputs and a bias term. FIG. 10 is a diagram for explaining a method for calculating the number of parameters and the calculation amount in the Affine layer.

In an example in FIG. 10, three Inputs and four Outputs are illustrated. Further, a weight W is illustrated in FIG. 10, and in the present example, weights W of $W_{1,1}$ to $W_{3,4}$ are illustrated. That is, the number of weights W in the Affine layer can be calculated by multiplication of Input and Output. Therefore, the number of parameters in the Affine layer can be calculated through the following equation (1). b in the equation (1) indicates a bias term. Further, the weight W can be obtained from a matrix indicated in the following equation (2).

[Math. 1]

$$W_x + b \tag{1}$$

$$W = (W_1, W_2, W_3) \tag{2}$$

The method for calculating the number of parameters in the Affine layer has been described above. Note that also the calculation amount in the Affine layer can be calculated using the above-described method.

(Calculation Example Relating to Convolution Layer)

Figure 11:
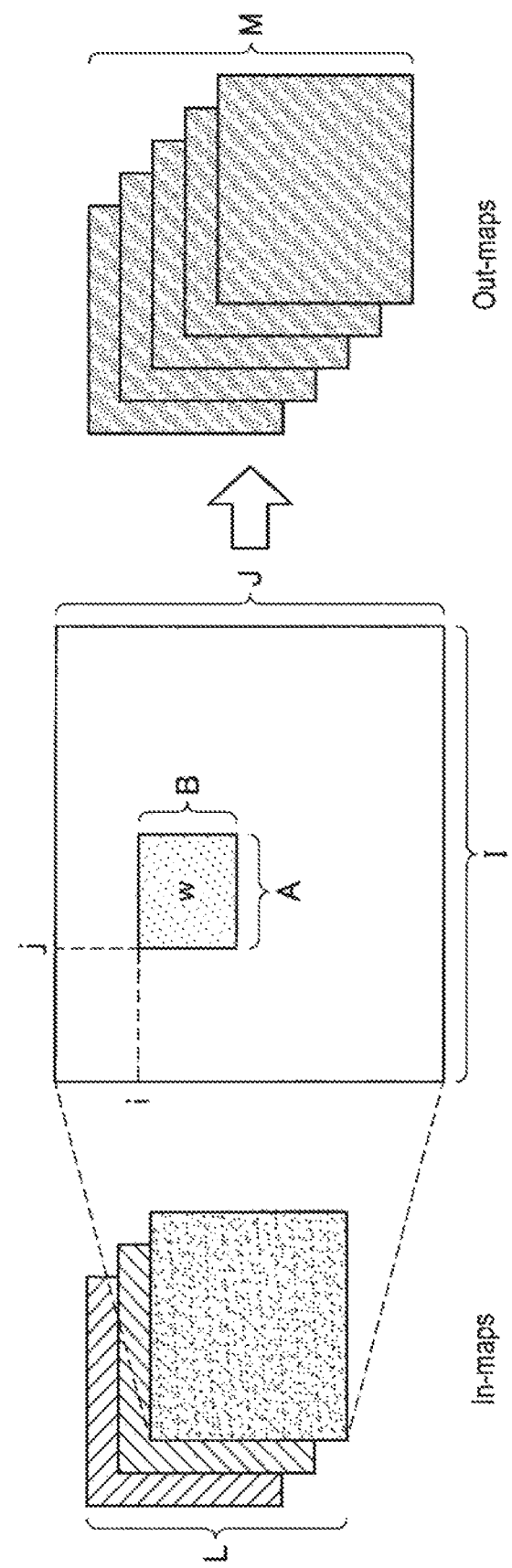
FIG. 11 is a diagram for explaining a calculation method specific to a Convolution layer according to the embodiment.

Subsequently, a method for calculating the number of parameters in a Convolution layer will be described. The number of parameters and the calculation amount in the Convolution layer are calculated on the basis of a Map size, the number of input Maps and the number of output Maps. FIG. 11 is a diagram for explaining a method for calculating the number of parameters and the calculation amount in the Convolution layer.

In an example in FIG. 11, the input Map is indicated as L, and the output Map is indicated as M. Further, the weight W can be calculated from a×b, and indicates an amount of single convolution calculation. Because, in the Convolution layer, the convolution calculation is repeated the number of times corresponding to the number of input Maps×output Maps, the value of Output can be calculated from a×b×L×M. That is, in the Convolution layer, it is possible to calculate the number of parameters and the calculation amount by using the following equation (3).

[Math. 2]

$$u_{i,j,m} = \sum_{l=1}^{L} \sum_{a,b=1}^{A,B} w_{a,b,m,l} \times x_{i+a,j+b,l} + b_{i,j,m} \quad (3)$$

The method for calculating the number of parameters and the calculation amount in the layers has been described above using examples. While, in the above description, the Affine layer and the Convolution layer which are often used as a configuration of a neural network have been described, the number of parameters and the calculation amount in other layers can be also calculated using a method specific to the layer.

As described above, in the information processing method according to the present embodiment, it is possible to update values of the statistical information relating to the neural network by recalculating the number of parameters and the calculation amount for each layer on the basis of change of the layer configuration.

2.6. Calculation of Execution Prediction Information on Hardware

Calculation of execution prediction information on hardware according to the present embodiment will be described next. In the information processing method according to the present embodiment, it is possible to calculate the execution prediction information of the neural network on hardware on the basis of the statistical information and profile of the hardware. The above-described function will be described in detail below with reference to FIG. 12.

FIG. 12 is a diagram illustrating an example of the execution prediction information of a neural network on hardware. The execution prediction information according to the present embodiment may be a value calculated by the program creating unit 310 of the server 30 on the basis of the statistic information and the profile of the hardware. Note that the profile of the hardware may include hardware specifications of the hardware, limit information relating to execution of a neural network, or the like. Further, the execution prediction information according to the present embodiment may be displayed in the palette P3 on the form F1 illustrated in FIG. 5.

Referring to FIG. 12, the execution prediction information according to the present embodiment includes training time by a neural network, a memory usage amount, power consumption, and a calculation amount. The program creating unit 310 can calculate the above-described items in real time in accordance with updating of the statistical information calculated on the basis of the layer configuration.

Further, the program creating unit 310 can generate alert information on the basis that the statistical information deviates from a range of the limit information included in the profile of the hardware. In an example illustrated in FIG. 12, the program creating unit 310 generates alert information on the basis that the statistical information deviates from limit relating to a memory usage amount of the hardware. Further, the form control unit 130 of the information processing terminal 10 receives the above-described alert information and controls a display format of the execution prediction information indicated on the palette P3 on the basis of the information. The display control by the form control unit 130 may be highlighting of background of an item which deviates from the limit, for example, as illustrated in FIG. 12. Further, the form control unit 130 may cause a message relating to an alert to be displayed on the form.

As described above, according to the information processing method according to the present embodiment, it is possible to present the execution prediction information of the neural network on hardware. Further, the execution prediction information according to the present embodiment may be information calculated in real time on the basis of updating of the statistical information. The user can perform visual programming so as not to deviate from limit information of hardware implementing a neural network by confirming the execution prediction information.

Note that, while not illustrated in FIG. 12, the execution prediction information according to the present embodiment may be presented while being compared with the limit information of the hardware. In this case, the user can establish a neural network while confirming an upper limit of each item relating to limit of the hardware.

2.7. Calculation of Estimation Information of Cloud Resources

Calculation of estimation information of cloud resources according to the present embodiment will be described. In the information processing method according to the present embodiment, it is possible to calculate the estimation information relating to computing resources on cloud for executing processing by a neural network on the basis of the statistical information and information acquired from cloud service. Further, in the information processing method according to the present embodiment, it is possible to handle each item in the above-described calculated estimation information as a variable and change a value of each item. In this case, values of other items may be updated on the basis of the changed value of the item. The above-described function will be described in detail below with reference to FIG. 13.

FIG. 13 is a diagram illustrating an example of the estimation information relating to the cloud resources for executing processing by a neural network. The estimation information according to the present embodiment may be a value calculated by the program creating unit 310 of the server 30 on the basis of the statistical information and the information acquired from the cloud service. Note that the information acquired from the cloud service may include specifications of instances to be provided and cost information. Note that the specifications of the instances may include information of a graphics processing unit (GPU) to be used for the instances, a central processing unit (CPU), or the like. Further, the estimation information according to the present embodiment may be displayed in the palette P3 on the form F1 illustrated in FIG. 5.

Referring to FIG. 13, the estimation information according to the present embodiment includes types of the instances to be provided, the number of the instances, the cost information and training time by the neural network. The program creating unit 310 can calculate the above-described items in real time in accordance with updating of the statistical information calculated on the basis of a layer configuration. Specifically, the estimation information according to the present embodiment may be calculated using the following equation (4).

[Math. 3]

$$\min_{f,g} -\sum_i z_i [\ln f(x)]_i + \|y - g(x)\|^2 \qquad (4)$$

Note that f and g may be arbitrary functions in above-described equation (4). Further, z indicates a type of an instance, y indicates the number of instances, cost and training time. Still further, x indicates statistical information, the number of items of input data and the number of classes in an identification problem. The first term is Categorical cross entropy, and may be an error function with respect to z which is a category value. Further, the second term is a square error term, and may be an error function with respect to a continuous value. Note that the number of classes in the identification problem, the functions f and g may be obtained through learning by a neural network.

Calculation of the estimation information according to the present embodiment has been described above. Subsequently, change of the estimation information according to the present embodiment will be described in detail. As described above, in the information processing method according to the present embodiment, it is possible to handle each item in the calculated estimation information as a variable and change the value of each item. Further, in the case where a value of an item in the estimation information is changed, the program creating unit 310 can recalculate values of other items on the basis of change of the value of the item. For example, in the case where a value of cost is changed by the user, the program creating unit 310 recalculates values of the type of the instance, the number of instances and the training time on the basis that the value of the cost in the estimation information is changed. In this event, the value of each item may be calculated through the following equation (5). Note that, for an item designated by the user, a value designated by the user is used in place of the corresponding estimating function.

[Math. 4]

$$\min_{f_1,g_1,h_1,f_2,g_2,h_2,f_3,g_3,h_3,f_4,g_4,h_4} \qquad (5)$$

$$\sum_i [y_1]_i [\ln f_1(h_1(x) + g_1(y_{\backslash 1}))]_i +$$

$$\|y_2 - f_2(h_2(x) + g_2(y_{\backslash 2}))\|^2 +$$

$$\|y_3 - f_3(h_3(x) + g_3(y_{\backslash 3}))\|^2 +$$

$$\|y_4 - f_4(h_4(x) + g_4(y_{\backslash 4}))\|^2$$

In the above-described equation (5), f, g and h may be arbitrary functions. Further, $y_1$ to $y_4$ respectively indicate the type of the instance, the number of instances, the cost and the training time. Note that, in the above-described equation (5), values indicated with y, a backslash and j (1 to 4) mean all y except only a j-th response variable following the backslash. By this means, it is possible to perform calculation while excluding the response variable from explanatory variables.

Further, in the above-described equation (5), x indicates the statistical information, the number of items of input data and the number of classes in the identification problem. The first term is Categorical cross entropy, and may be an error function with respect to y backslash 1 which is a category value. Further, the second term, the third term and the fourth term are square error terms, and may be error functions with respect to a continuous value. Note that the number of classes in the identification problem, the functions f, g and h may be obtained through learning by a neural network. That is, accuracy of the above-described equation (5) is expected to be improved as a result of data being accumulated through learning.

As described above, according to the information processing method according to the present embodiment, it is possible to present the estimation information relating to computing resources on cloud for executing processing by a neural network. Further, the estimation information according to the present embodiment may be information calculated in real time on the basis of updating of the statistical information. Still further, in the information processing method according to the present embodiment, on the basis that a value of an arbitrary item included in the estimation information is designated, values of other items except the item may be recalculated and presented. By this means, the user can perform visual programming while judging trade-off between the cost information of the cloud resources and the training time by a neural network.

2.8. Coordination Among Statistical Information, Property and Estimation Information Coordination among the statistical information, the property and the estimation information according to the present embodiment will be described in detail next. As described above, the statistical information according to the present embodiment is calculated on the basis of the layer configuration, and the estimation information according to the present embodiment is calculated on the basis of the statistical information. Meanwhile, the value set for the property according to the present embodiment may be dynamically changed on the basis that the statistical information is changed. Further, the statistical information according to the present embodiment may be dynamically changed on the basis that the estimation information is changed. The above-described function according to the present embodiment will be described in detail below with reference to FIG. 14.

Figure 14:
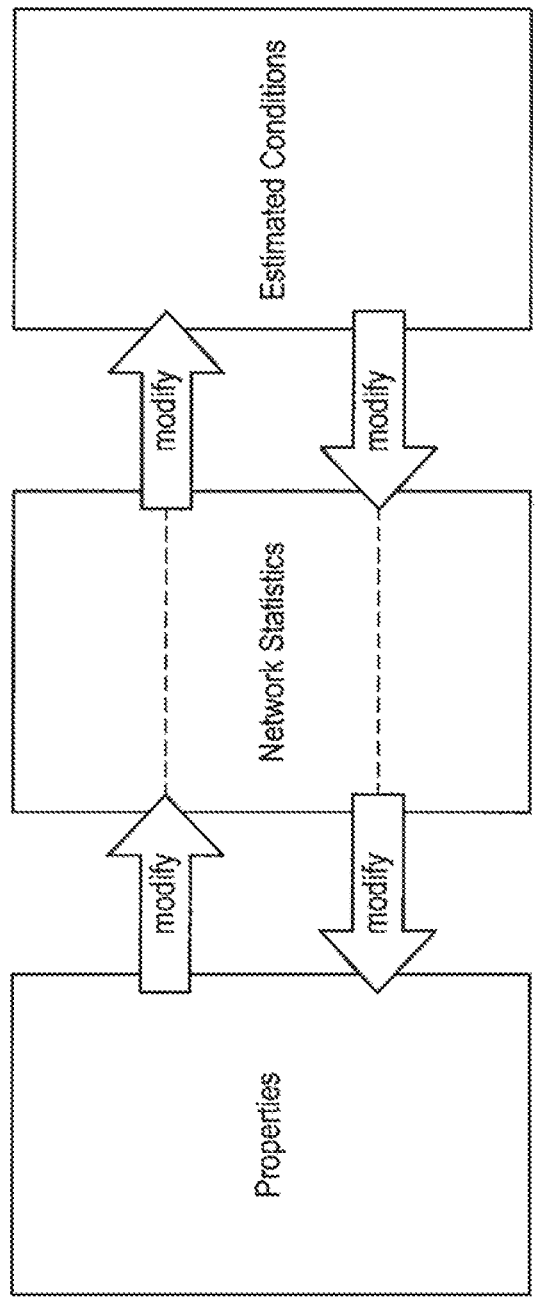
FIG. 14 is a diagram for explaining coordination among the property, the statistical information and the estimation information according to the embodiment.

FIG. 14 is a diagram for explaining relationship among the property, the statistical information and the estimation information according to the present embodiment. Referring to FIG. 14, in the information processing method according to the present embodiment, it is possible to dynamically change the statistical information on the basis that the value of the property is changed. Further, in this event, the estimation information may be further changed on the basis of the dynamically changed statistical information.

Further, in the information processing method according to the present embodiment, the statistical information may be dynamically changed on the basis that the estimation information is changed. Further, in this event, the value of the property may be further changed on the basis of the dynamically changed statistical information.

An example in the case where the value of the properly is changed on the basis of change of the statistical information will be described below. In this event, each item of the statistical information may be handled as a variable, and the value may be designated by the user. Further, the value of the property which is changed on the basis of change of the statistical information, may be changed in accordance with a contribution rate of each layer. Here, description will be provided assuming a neural network in which processing is performed in respective layers of Input, Convolution, Affine and Output in this order.

In the neural network relating to the above-described layer configuration, in the case where the number of parameters of the Convolution layer and the number of parameters of the Affine layer are respectively 400 and 7840, the contribution rate of the layers can be respectively calculated as 4.85 and 95.15. The program creating unit 310 according to the present embodiment can dynamically change the value of each layer by distributing the number of parameters of the changed statistical information to the Convolution layer and the Affine layer in accordance with the contribution rate calculated using the above-described method.

As described above, according to the information processing method according to the present embodiment, it is possible to make the values of the statistical information, the property and the estimation information dynamically coordinate with one another. By this means, it is possible to reduce the burden of the user and further improve efficiency relating to development of a neural network.

2.9. Presentation of Comparison Information Relating to Layers

Presentation of comparison information relating to layers according to the present embodiment will be described next. In the information processing method according to the present embodiment, it is possible to present comparison information of respective layers constituting the statistical information to the user. The form control unit 130 of the information processing terminal 10 can cause the above-described comparison information to be displayed on the basis of the information acquired from the server 30. FIG. 15 is a diagram illustrating a display example of the comparison information according to the present embodiment.

FIG. 15 illustrates an example in the case where "Cost-Parameter" is selected in the statistical information 12 displayed on the palette P3. Further, referring to FIG. 15, in addition to the layer configuration, a plurality of numerical values and bars are displayed in the palette P2. Here, the numerical values and the bars may be comparison information of each layer relating to the selected items of the statistical information. That is, in FIG. 15, the values of "CostParameter" in the respective layers are indicated with the numerical values and the bars. Referring to FIG. 15, for example, it can be understood that "CostParameter" in a "Convolution #1" layer is 416. Further, it can be understood that "CostParameter" in a "Convolution #2" is 6416.

Further, the bar included in the above-described comparison information may be an indicator which indicates a size of the value of the item. That is, as the bar included in the comparison information, a longer bar may be displayed for a greater value of the item. In this event, the length of the bar may be determined by an absolute value of the value or may be determined by a relative value with the value in each layer.

As described above, according to the information processing method according to the present embodiment, it is possible to present the comparison information of the respective layers constituting the statistical information to the user. By this means, the user can intuitively perceive the calculation amount of each layer and can refer to the calculation amount of each layer when changing the layer configuration of the neural network.

2.10. Presentation of Execution Result Relating to Neural Network

Presentation of an execution result relating to a neural network of the present embodiment will be described next. In the information processing method according to the present embodiment, it is possible to acquire an execution result of a neural network executed on the emulator or the device 40 and present the execution result to the user. The emulator unit 320 can execute the program relating to the neural network created by the program creating unit 310 on the emulator and can acquire the execution result. Further, the emulator unit 320 can cause the device 40 to execute the program relating to the neural network created by the program creating unit 310 and can acquire the execution result.

FIG. 16 is a diagram illustrating an example of the execution result according to the present embodiment. Referring to FIG. 16, the execution result according to the present embodiment includes training time by a neural network, a memory usage amount, power consumption, and a calculation amount. Note that the execution result according to the present embodiment may be displayed in the palette P3 on the form F1 illustrated in FIG. 5.

As described above, according to the information processing method according to the present embodiment, it is possible to present the execution result of a neural network executed on the emulator or the device 40 to the user. By this means, the user can confirm the execution result of the created neural network on a development screen.

3. Hardware Configuration Example

Figure 17:
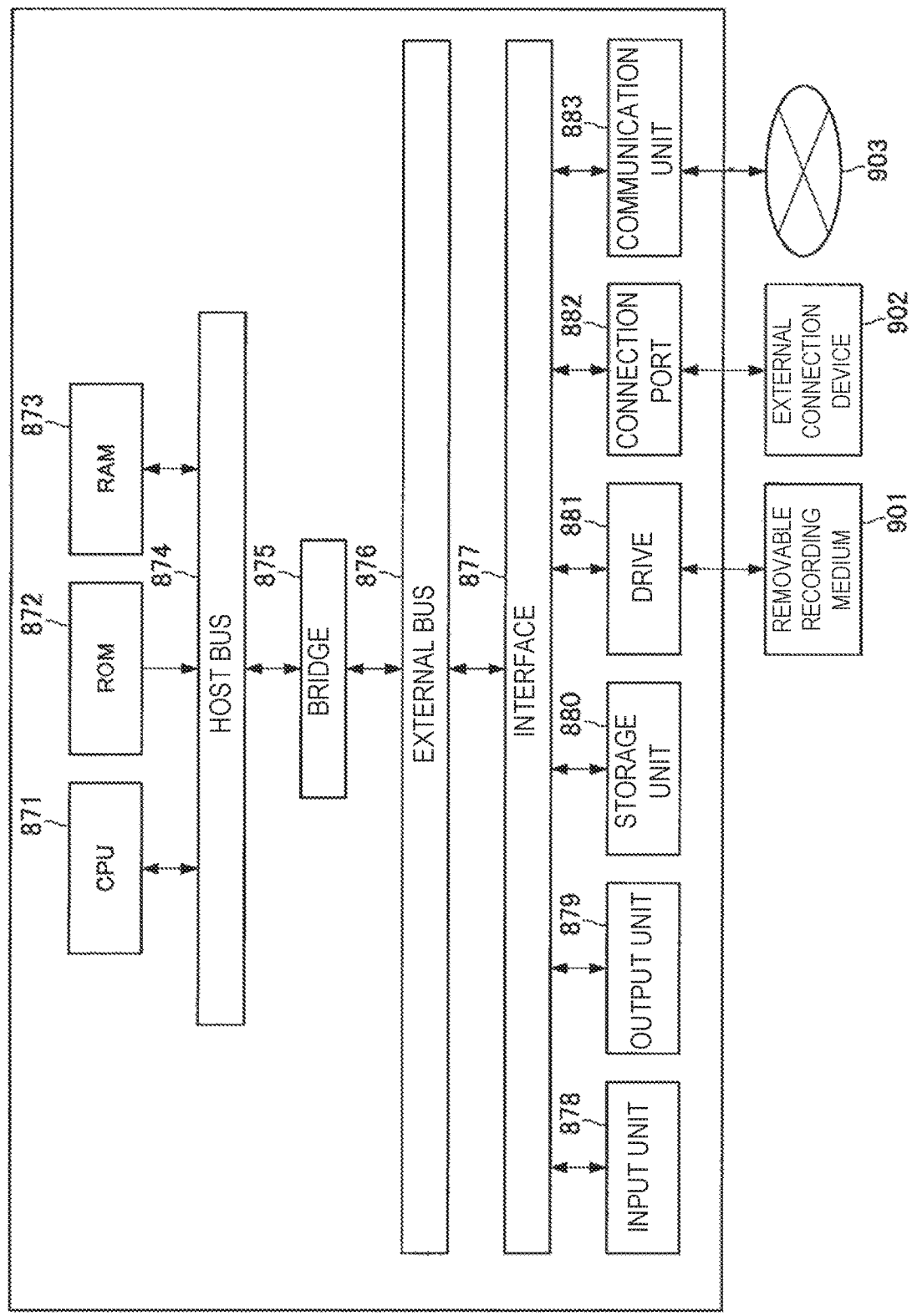
FIG. 17 is a diagram illustrating a hardware configuration example according to the present disclosure.

Next, a hardware configuration example common to the information processing terminal 10, the server 30, and the device 40 according to the present disclosure will be described. FIG. 17 is a block diagram illustrating a hardware configuration example of each of the information processing terminal 10, the server 30, and the device 40 according to the present disclosure. Referring to FIG. 17, each of the information processing terminal 10, the server 30, and the device 40 includes, for example, a CPU 871, a ROM 872, a RAM 873, a host bus 874, a bridge 875, an external bus 876, an interface 877, an input unit 878, an output unit 879, a storage unit 880, a drive 881, a connection port 882, and a communication unit 883. The hardware configuration described here is an example, and some components may be omitted. A component other than components described here may be further added.

(CPU 871)

The CPU 871 functions as, for example, an operation processing device or a control device and controls operations of all or some of the components on the basis of various kinds of programs recorded in the ROM 872, the RAM 873, the storage unit 880, or a removable recording medium 901.

(ROM 872 and RAM 873)

The ROM 872 is a device that stores programs read by the CPU 871, data used for operations, and the like. For example, a program read by the CPU 871, various kinds of parameters that appropriately change when the program is executed, and the like are temporarily or permanently stored in the RAM 873.

(Host Bus 874, Bridge 875, External Bus 876, and Interface 877)

For example, the CPU 871, the ROM 872, and the RAM 873 are connected to one another the host bus 874 capable of performing high-speed data transmission. On the other hand, for example, the host bus 874 is connected to an external bus 876 having a relatively low data transmission speed via the bridge 875. Further, the external bus 876 is connected to various components via the interface 877.

(Input Unit 878)

Examples of the input unit 878 include a mouse, a keyboard, a touch panel, a button, a switch, and a lever. Further, a remote controller capable of transmitting a control signal using infrared rays or other radio waves (hereinafter referred to as a remote controller) may be used as the input unit 878.

(Output Unit 879)

The output unit 879 is a device which is capable of notifying the user of acquired information visually or audibly such as, for example, a display device such as a cathode ray tube (CRT), an LCD, or an organic EL, an audio output device such as a speaker or a headphone, a printer, a mobile phone, a facsimile.

(Storage Unit 880)

The storage unit 880 is a device that stores various kinds of data. Examples of the storage unit 880 include a magnetic storage device such as a hard disk drive (HDD), a semiconductor storage device, an optical storage device, and a magneto-optical storage device.

(Drive 881)

The drive 881 is a device that reads out information recorded in the removable recording medium 901 such as a magnetic disk, an optical disk, a magneto-optical disk, a semiconductor memory, or the like or writes information in the removable recording medium 901.

(Removable Recording Medium 901)

Examples of the removable recording medium 901 include a DVD medium, a Blu-ray (a registered trademark) medium, an DVD medium, and various kinds of semiconductor storage media. It will be appreciated that the removable recording medium 901 may be, for example, an IC card in which a non-contact type IC chip is mounted, an electronic device, or the like.

(Connection Port 882)

The connection port 882 is a port for connecting an external connection device 902 such as a universal serial bus (USB) port, an IEEE 1394 port, a small computer system interface (SCSI), an RS-232C port, or an optical audio terminal.

(External Connection Device 902)

Examples of the external connection device 902 include a printer, a portable music player, a digital camera, a digital video camera, and an IC recorder.

(Communication Unit 883)

The communication unit 883 is a communication device that establishes a connection with the network 903, and examples of the communication unit 883 include a communication card for wired or wireless LAN, Bluetooth (a registered trademark), or wireless USB (WUSB), an optical communication router, an asymmetric digital subscriber line (ADSL) router, and various kinds of communication modems.

4. Conclusion

As described above, in the information processing method according to the present disclosure, it is possible to provide a form for creating a program for establishing a neural network on the basis of disposed layers and property set for the layers. Further, in the information processing method according to the present disclosure, it is possible to present statistical information relating to the above-described neural network. According to such a configuration, it is possible to present information which improves development efficiency of a neural network to the user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while, in the above-described embodiment, a case has been described as an example where the server 30 calculates the statistical information in real time on the basis of change of the layer configuration, the present technology is not limited to such an example. For example, calculation of the statistical information based on change of the layer configuration may be implemented by the information processing terminal 10. In this case, the form control unit 130 of the information processing terminal 10 can calculate the statistical information in real time on the basis of change of the layer configuration. Further, updating of the statistical information does not always have to be performed in real time. For example, the program creating unit 310 may update the statistical information on the basis that the user performs processing of settling editing of the layer configuration.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing method including:

providing, by a processor, a form for creating a program for establishing a neural network on a basis of a disposed component and property set for the component; and presenting statistical information relating to the neural network.

(2)

The information processing method according to (1), in which the statistical information includes at least one of a number of output units, a number of parameters to be processed and a calculation amount for each type of calculation in the neural network.

(3)

The information processing method according to (2), in which the statistical information calculated on a basis that the component disposed on the form or the property set for the component is changed is presented in real time.

(4)

The information processing method according to any of (1) to (3), further including presenting execution prediction information of the neural network in hardware calculated on a basis of the statistical information and profile of the hardware on which the neural network is implemented.

(5)

The information processing method according to (4), in which the execution prediction information includes at least one of execution time of processing by the neural network, a memory usage amount, power consumption, and a calculation amount.

(6)

The information processing method according to (4) or (5), further including presenting alert information generated on a basis that the statistical information deviates from limit information in the hardware.

(7)

The information processing method according to any of (1) to (6), further including presenting estimation information relating to a computing resource on cloud for executing processing by the neural network, the estimation information being calculated on a basis of the statistical information.

(8)

The information processing method according to (7), in which the estimation information relating to the computing resource includes at least one of types of instances, a number of the instances, cost, and processing time by the neural network implemented on the computing resource.

(9)

The information processing method according to (7) or (8), further including accepting operation by a user for changing a value of the statistical information and presenting in real time a property value of the component changed on a basis of the operation and the estimation information relating to the computing resource.

(10)

The information processing method according to any of (7) to (9), further including accepting operation by the user for changing a value of the estimation information relating to the computing resource and presenting in real time a property value of the component changed on a basis of the operation and the statistical information.

(11)

The information processing method according to any of (1) to (10), further including accepting operation by the user for selecting an element included in the statistical information and presenting a value of the selected element while comparing the values of respective components.

(12)

The information processing method according to (11), in which the value of the element for each component and an indicator indicating a magnitude of the value of the element are presented in association with the component disposed on the form.

(13)

The information processing method according to any of (1) to (12), further including presenting an execution result of the neural network on an emulator.

(14)

The information processing method according to any of (11) to (13), further including presenting an execution result of the neural network on hardware.

(15)

The information processing method according to (13) or (14), in which the execution result includes at least one of execution time of processing by the neural network, a memory usage amount, power consumption, and a calculation amount.

(16)

An information processing apparatus including a form control unit configured to provide a form for creating a program for establishing a neural network on a basis of a disposed component and property set for the component, in which the form control unit presents statistical information relating to the neural network.

(17)

An information processing apparatus including a program creating unit configured to create a program for establishing a neural network on a basis of a component disposed on a form and property set for the component, in which the program creating unit calculates statistical information relating to the neural network.

REFERENCE SIGNS LIST 10 information processing terminal
110 display unit
120 input unit
130 form control unit
140 server communication unit
20 network
30 server
310 program creating unit
320 emulator unit
330 terminal communication unit
40 device

The invention claimed is:

1. An information processing method comprising:
providing, by a processor, a form for creating a visual program for establishing a neural network on a basis of a plurality of disposed components of the neural network and property set for the plurality of components; and
displaying, on a display unit, statistical information relating to the neural network,
wherein the statistical information includes a number of times of each type of calculation, and
wherein the type of calculation includes at least one of multiplication, multiply add, and index calculation,
wherein the statistical information is calculated and displayed in real time on a basis that a layer configuration of the plurality of components disposed on the form is changed.

2. The information processing method according to claim 1,
wherein the statistical information includes at least one of a number of output units and a number of parameters to be processed in the neural network.

3. The information processing method according to claim 1,
wherein the statistical information is further calculated and displayed in real time on a basis that the property set for the plurality of components is changed.

4. The information processing method according to claim 1, further comprising:
  presenting execution prediction information of the neural network in hardware calculated on a basis of the statistical information and profile of the hardware on which the neural network is implemented.

5. The information processing method according to claim 4,
  wherein the execution prediction information includes at least one of execution time of processing by the neural network, a memory usage amount, power consumption, and a calculation amount.

6. The information processing method according to claim 4, further comprising:
  presenting alert information generated on a basis that the statistical information deviates from limit information in the hardware.

7. The information processing method according to claim 1, further comprising:
  presenting estimation information relating to a computing resource on cloud for executing processing by the neural network, the estimation information being calculated on a basis of the statistical information.

8. The information processing method according to claim 7,
  wherein the estimation information relating to the computing resource includes at least one of types of instances, a number of the instances, cost, and processing time by the neural network implemented on the computing resource.

9. The information processing method according to claim 7, further comprising:
  accepting an operation by a user for changing a value of the statistical information and presenting in real time a property value of the component changed on a basis of the operation and the estimation information relating to the computing resource.

10. The information processing method according to claim 7, further comprising:
  accepting an operation by a user for changing a value of the estimation information relating to the computing resource and presenting in real time a property value of the component changed on a basis of the operation and the statistical information.

11. The information processing method according to claim 1, further comprising:
  presenting a value of an element included in the statistical information while comparing values of respective components.

12. The information processing method according to claim 11,
  wherein the value of the element for each component and an indicator indicating a magnitude of the value of the element are presented in association with the component disposed on the form.

13. The information processing method according to claim 1, further comprising:
  presenting an execution result of the neural network on an emulator.

14. The information processing method according to claim 1, further comprising:
  presenting an execution result of the neural network on hardware.

15. The information processing method according to claim 13,
  wherein the execution result includes at least one of execution time of processing by the neural network, a memory usage amount, power consumption, and a calculation amount.

16. The information processing method according to claim 11, further comprising:
  accepting an operation by a user for selecting the element and presenting a value of the selected element while comparing the values of respective components.

17. An information processing apparatus comprising:
  a form control unit configured to
    provide a form for creating a visual program for establishing a neural network on a basis of a plurality of disposed components of the neural network and property set for the plurality of components, and
    control a display unit to display statistical information relating to the neural network,
  wherein the statistical information includes a number of times of each type of calculation,
  wherein the type of calculation includes at least one of multiplication, multiply add, and index calculation,
  wherein the statistical information is calculated and displayed in real time on a basis that a layer configuration of the plurality of components disposed on the form is changed, and
  wherein the form control unit is implemented via at least one processor.

18. An information processing apparatus comprising:
  a program creating unit configured to
    create a program for establishing a neural network on a basis of a plurality of components of the neural network disposed on a form and property set for the plurality of components, and
    calculate statistical information relating to the neural network; and
  a terminal communication unit configured to provide the form for creating a visual program and the statistical information for displaying on a display unit,
  wherein the statistical information includes a calculation amount for each type of calculation,
  wherein the type of calculation includes at least one of multiplication, multiply add, and index calculation,
  wherein the statistical information is calculated and displayed in real time on a basis that a layer configuration of the plurality of components disposed on the form is changed, and
  wherein the program creating unit and the terminal communication unit are each implemented via at least one processor.

* * * * *